Aug. 20, 1940.     J. A. JENSEN     2,212,370
EMERGENCY VALVE AND MECHANISM REMOVER-REPLACER
Filed Oct. 20, 1939     5 Sheets-Sheet 1
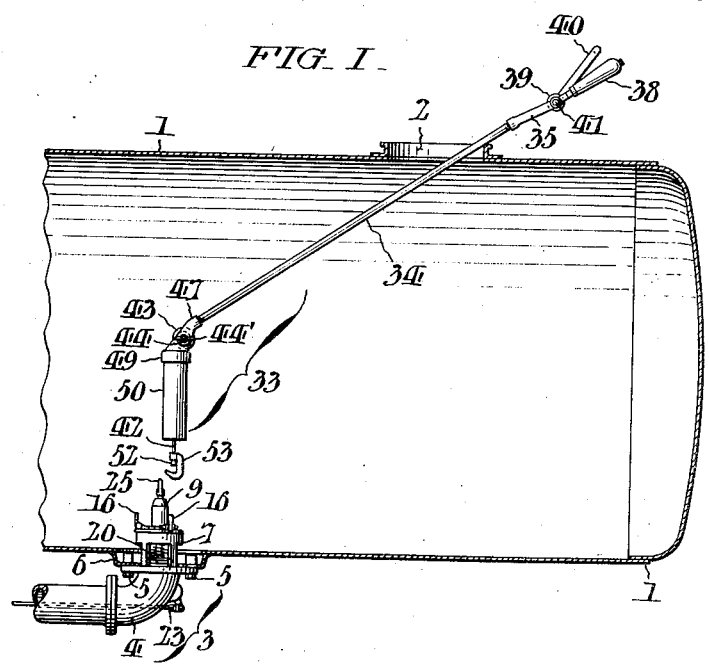
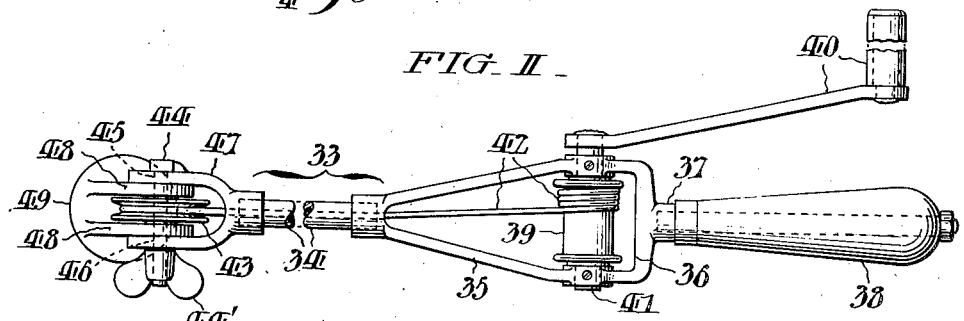
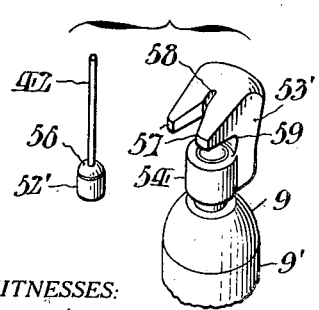 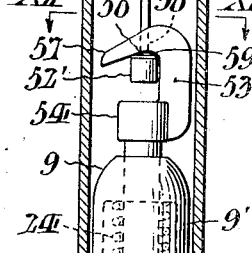 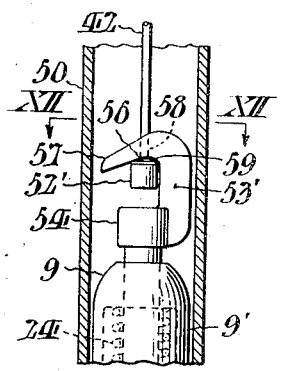
WITNESSES:
INVENTOR:
James A. Jensen,
BY
ATTORNEYS.

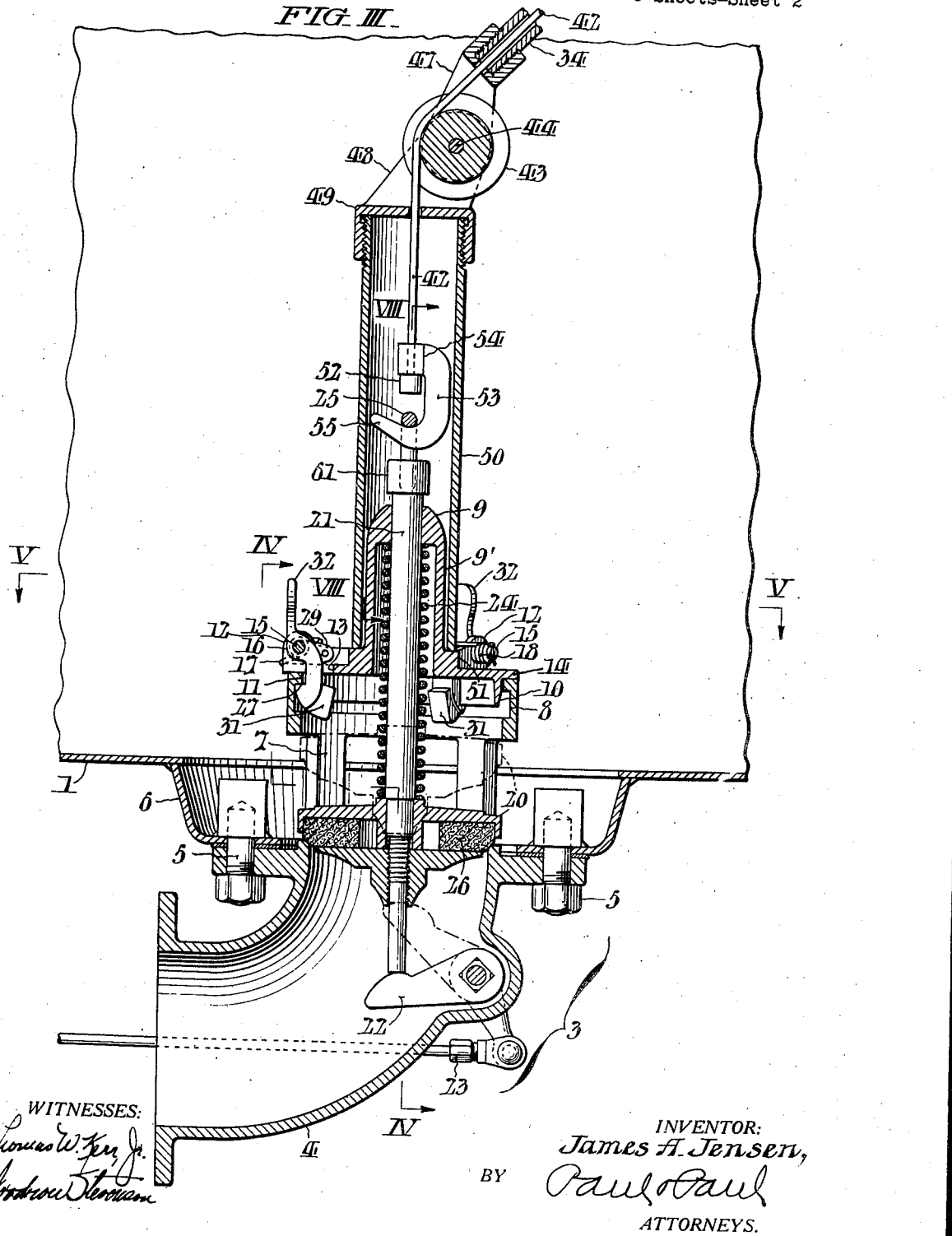

Aug. 20, 1940.    J. A. JENSEN    2,212,370
EMERGENCY VALVE AND MECHANISM REMOVER-REPLACER
Filed Oct. 20, 1939    5 Sheets-Sheet 3
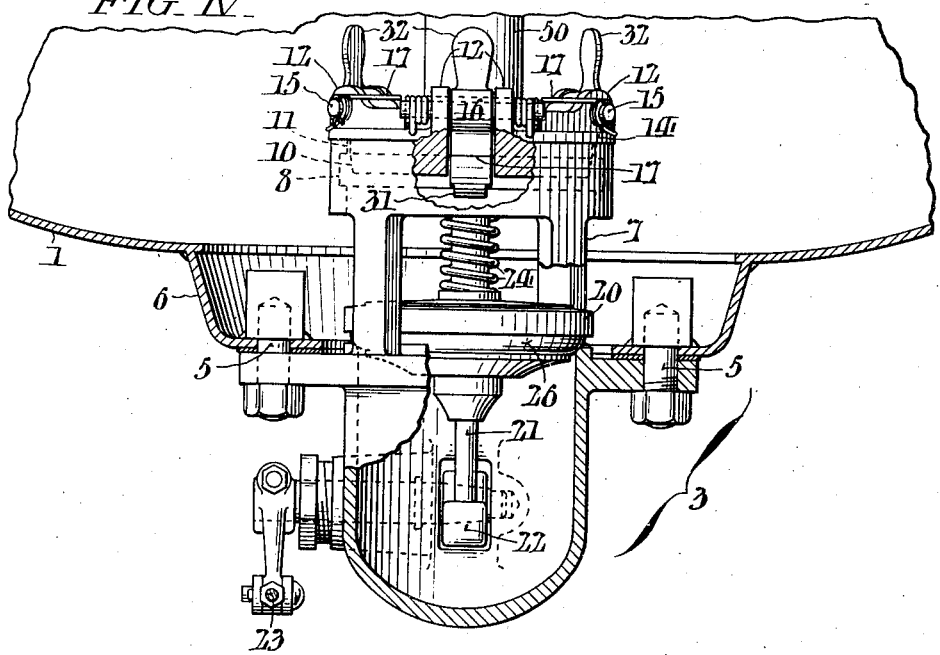
FIG. IV.
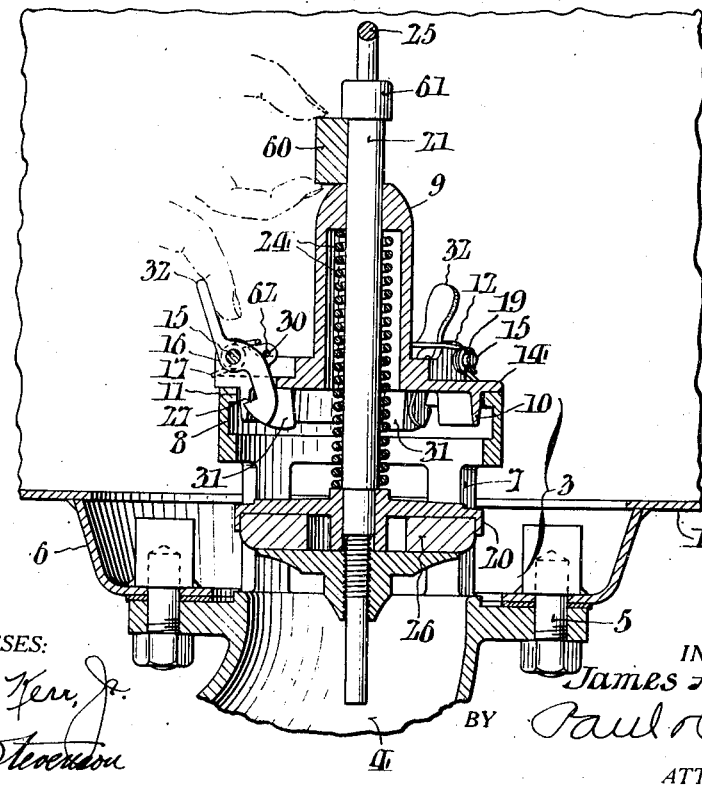
FIG. VII.
WITNESSES:
INVENTOR:
James A. Jensen,
BY
ATTORNEYS.

Aug. 20, 1940.　　　　J. A. JENSEN　　　　2,212,370
EMERGENCY VALVE AND MECHANISM REMOVER-REPLACER
Filed Oct. 20, 1939　　　5 Sheets-Sheet 4
FIG. V.
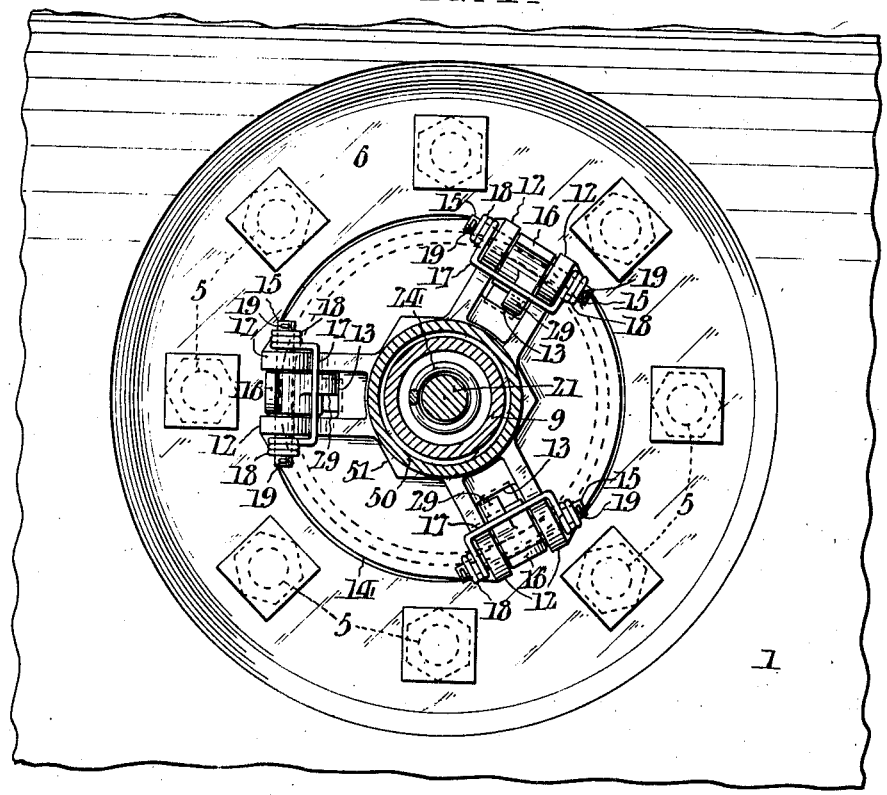
FIG. VIII.
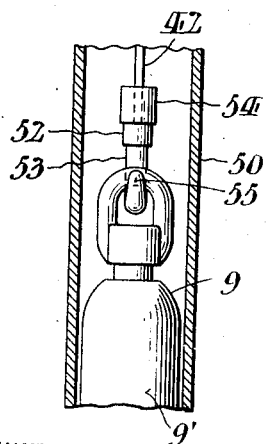
FIG. IX.
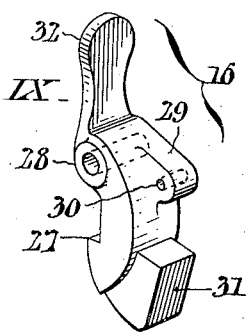
WITNESSES.
INVENTOR:
James A. Jensen,
BY
ATTORNEYS.

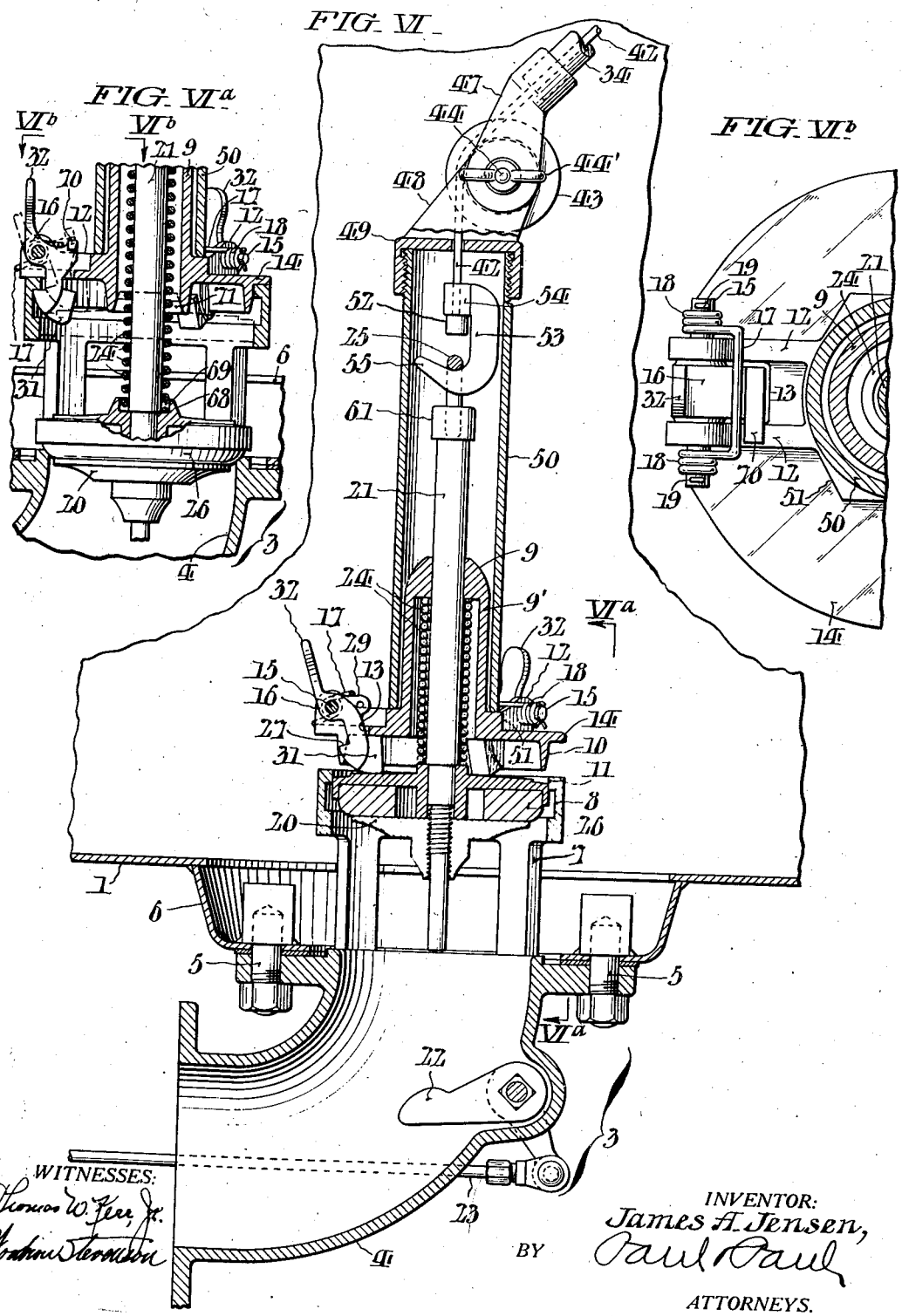

Patented Aug. 20, 1940

2,212,370

UNITED STATES PATENT OFFICE 2,212,370

EMERGENCY VALVE AND MECHANISM REMOVER-REPLACER

James A. Jensen, Philadelphia, Pa., assignor to Charles E. Frick, Jr., J. Rodman McCoy, Elsie T. Heller, John H. Jensen, and James A. Jensen, co-partners, trading as Philadelphia Valve Company, Philadelphia, Pa.

Application October 20, 1939, Serial No. 300,325

6 Claims. (Cl. 137—21)

This invention has general reference to emergency valves and associated means whereby the operative mechanism may be removed from and replaced in the valve body whenever desirable or expedient. More particularly, the present improvements relate to emergency valves, for vehicle tanks used in transportation of inflammable and other liquids; and which are adapted to prevent escape of such liquids in the event of fire or other hazards.

Heretofore emergency valves for the above stated service have usually included a cage or bonnet, housing the lift-element and associated mechanism, said bonnet being screw-threaded to the valve body, and much difficulty has been experienced in removing the bonnet for access to the lift-element in order to remove or replace the conventional composition wear disc or equivalent component. Ordinarily, such removal of the valve bonnet has necessitated thorough steaming of the tank to eliminate the fumes before a man could safely enter to detach said bonnet; while it has also been proposed to effect such removal by aid of wrench means insertable through the tank manhole or filler opening. Such means while measurably successful for effecting detachment of the bonnet, have been objectionable to handle when making replacements owing to the difficulty in starting the screw-threading operation and the prevention of "thread strippage" or other binding of the parts.

The primary object of this invention is to eliminate the above noted disadvantages of prior structures by provision of an emergency valve having a "snap" engageable bonnet and associated valve element adapted for quick release and replacement.

Another object is to provide an emergency valve of the type indicated in the preceding paragraph with a remotely operable device for positive replacement of the bonnet in position without any rotary movement or other manipulation.

A further object is the provision of means of the indicated character which is simple and compact in construction and easily actuable, at a distance from the emergency valve, without any necessity for the operator entering the tank wherein said valve is located.

Other objects, with ancillary advantages, achieved by this invention will be apparent from, or specifically referred to in, the following detailed description of a typical embodiment as illustrated by the accompanying sheets of drawings, while the features of novelty are more definitely expressed in the concluding claims.

In the drawings:

Fig. I is a fragmentary longitudinal section of one end of a truck tank showing the improved emergency valve and cage removing-replacing device in close relation.

Fig. II is a broken top plan view of the cage removing-replacing device.

Fig. III (Sheet 2) is a fragmentary vertical section through the emergency valve and engaged removing-replacing means, drawn to a larger scale for better illustration of important features.

Fig. IV (Sheet 3) is a fragmentary section on the staggered plane IV—IV of Fig. III.

Fig. V (Sheet 4) is a plan view on the plane V—V of Fig. III, looking in the direction of the associated arrows.

Fig. VI (Sheet 5) is a sectional view similar view similar to Fig. III, but showing the bonnet and associated parts released from the valve ready for removal.

Fig. VI$^a$ is a fragmentary sectional view similar to Fig. VI of a modified construction, said view being taken approximately between the arrows VI$^a$—VI$^a$ in Fig. VI.

Fig. VI$^b$ is a fragmentary plan view on the plane VI$^b$—VI$^b$ of Fig. VI$^a$.

Fig. VII (Sheet 3) is a vertical section showing how the valve cage can be manually released from the emergency valve.

Fig. VIII (Sheet 4) is a fragmentary section, taken approximately as indicated by the arrows VIII—VIII in Fig. III.

Fig. IX (Sheet 4) is a perspective view of a hook or claw hereinafter fully described.

Fig. X is a sectional detail somewhat similar to Fig. III of a modified feature of the present invention.

Fig. XI is an exploded perspective view of the connected parts shown within the section confines of the preceding figure; and, Fig. XII is a plan section as indicated by the arrows XII—XII in Fig. X.

In all the views, corresponding parts are distinguished by like reference characters.

Referring to the drawings with more particularity, the reference numeral 1 comprehensively designates the fragmentary end portion of a vehicle or truck tank; 2 the manhole or access opening; and 3 the emergency valve. This valve 3 includes an elbow body portion 4 attachable as by screw-studs 5 to the cupped discharge 6 below the truck tank 1 in accordance with known practice. The body portion 4 also embodies a circumferentially-apertured housing 7 which, in accordance with the present invention, is interiorly provided, preferably proximate the top, with a groove 8. The valve cover 9 is formed with an annular lip 10 for easy entry into the bore 11 of the housing 7, and on the upper surface are circumferentially spaced pairs of upstanding lugs 12 with intervening cut-outs 13 in the flange portion 14. Fulcrumed between the lugs 12, as by pivot pins 15 are hooks or latches 16 engageable in the housing groove 8, said hooks being influenced radially outwards below the pivot pins 15 by channel-shaped springs 17 having their ends 18 coiled about said pins beyond the outer limits of the lugs 12, as clearly shown in Fig. V, while the springs 17 are held in place by cotter pins 19, in an obvious manner. In the apertured housing 7 is an upwardly-actuable lift-valve 20, the stem 21 whereof, at its lower end, engages the rounded end of a lever arm 22, in turn operable by reciprocable connection 23 from an appropriate actuator mechanism, not shown. The upper portion of the stem 21 projects through the cylindrical portion 9' of the cover 9 and said stem is under the influence of a spring 24, in accordance with known practice. At its top the stem 21 is provided with a rigid bail 25, while 26 designates the customary composition disc or renewable ring fitted in the lift valve 20.

From Fig. IX, more particularly, it will be clearly seen that each device 16 embodies a latch portion 27 for engagement below the upper edge of the housing groove 8, Figs. III and IV: a hub portion 28 for pivotal coaction with the associated pin 15; a lug 29 having a hole 30 therethrough for a purpose later on set forth; an offset or heel 31 at the back of the latch portion 27; and a finger piece or grasp 32 in the general longitudinal plane of the latch device 16.

Referring to the valve removing-replacing device, comprehensively designated 33 in Figs. I and II, the same comprise a length of tubing or body portion 34 having, rigidly secured to one end, a somewhat fork-like extension 35 with the wider extremities connected by a bridge 36, in turn embodying a coupler projection 37 for attachment of an appropriate hand grasp 38. Transversely of the fork-like extension 35 is journaled a reel 39 having a crank-handle 40 secured to one end of the axis pin or shaft 41, and whereby said reel is rotatable. Secured to the reel 39 is one end of a flexible or other suitable cable 42, which passes through the body tubing 34, and is trained over a freely rotative sheave 43, journaled on a clamp-bolt 44, having a wing nut 44', passed through registering holes 45, 56 in a forked attachment 47 at the other end of the tubing 34, and spaced intervening lugs 48, respectively, which project angularly from a cap structure 49, screw-threaded to one end of a tubular section 50. This section 50 is of an internal diameter for free-passage over the valve cylindrical portion 9' of the cover 9, into engagement with the top face of an embossment 51, integral with the cover flange 14, as readily understandable from Figs. III and VI. Firmly attachd to the free end of the cable 42 is a suspension element 52 affording swivel support for an anchorage hook 53, through a bored portion 54 of which the cable 42 is passed before fixture of said element, whereas the claw portion 55 is appropriately shaped for easy passage through the valve stem bail 25.

In Figs. X-XII, inclusive, there is shown a modified form of anchorage means for connecting the cable 42 to the valve cover 9, said means differing in that the suspension element is more in the nature of a "plumb" 52', as clearly shown by the left-hand portion of Fig. XI, and it is provided with part spherical top 56; whereas the hook 53' is inverted and rigidly attached to the valve cover top end of the cylindrical portion 9'. The hook 53' is formed with an anchorage fork 57 merging inwardly to a slot 58 of a width to receive the cable 42; while the element top 56 coacts with a suitable rounding 59, formed for its reception in the hook 53'.

Having outlined the structural features of this invention and assuming that the normal "lift," or movement, of the valve 20 is insufficient for contact of the hook heels 31 with the upper surface of said valve, it will be readily understood that, in order to release the latch devices 16 from engagement in the housing groove 8, the valve 20 20 must be elevated above normal. In accordance with this invention, an operator takes hold of the removing-replacing device 33, releases or "pays-out" the cable 42 by turning the crank-handle 40 to the left sufficiently to lower the anchorage hook 53 below the free extremity of the tubular section 50, and, after inserting the device through the manhole 2 as shown in Fig. I, manipulates said device until the hook claw 55 engages the valve stem bail 25, whereupon the crank-handle 40 is turned to the right a few times until the tubular section is engaged over the valve cover cylindrical portion 9 with its bottom in abutment against the cover flange embossment 51, as clearly shown in Figs. III, IV and VI. Further additional rotation of the crank-handle 40 to the right-hand or clockwise first pulls the valve 20 above its normal "lift" or until the heels 31 of the latch devices 16 are engaged by the lift-valve 20 and rock said devices radially inwards on their respective pivot pins 15, and thereby release the latch portions 27 as best understood from Fig. VI. The crank-handle 40 may now be held in the just explained position, or released, while the operator withdraws the device 33 and connected lift valve 20 out through the manhole 2, whereupon the composition ring 26 can be refaced, or removed and substituted by a new one, in accordance with known practice. To replace the lift valve 20 the operations above described are obviously reversed. Attention is here directed to the fact that by providing clamp bolts 44 with wing-nuts 44', the angular position of the device section 50 may be changed with respect to the body portion 34, in order to accommodate easy manipulation when the emergency valve 3 is otherwise located than directly below the manhole 2, said section and body portions then being locked together by simply tightening-up the wing nut 44'.

Referring to the modification shown in Figs. VI$^a$ and VI$^b$ it will be seen that the lift valve 20 is provided with a central embossment 68 having a concentric recess 69 in which the lower end of the spring 24 seats for stabilizing said spring and to prevent lateral deflection thereof. In addition, the latch devices 16 are each formed with a lateral lug or projection 70 for engagement with the top of the adjoining cover flange lug 12 to prevent the latch device 16, when released from coaction with the valve body groove 8, swinging over beyond the vertical under the influence of the associated spring 17. By this provision, when the valve cover 9 and valve 20 are lifted, the several latch-devices 16 will be retained in a position for easy entry or re-insertion into the top of the valve 3, in an obvious manner. In addition, it is to be particularly noted the lower end of the valve cover 9 is extended, and interiorly tapered at 71, to provide a seat for the valve embossment 68 when lifted.

In cases where the emergency valve 3 is located easy of access or outside of the tank 1, and by reference to Fig. VII, it will be appreciated the valve stem 21 can be manually lifted and a piece of steel or a nut 60 slipped intermediate the bail attaching part 61 and the top end of the cover cylindrical portion 9, so as to temporarily retain the valve 20 elevated above normal and arrest axial expansive action of the spring 24. This operation not only removes pressure of the valve 20 from its seat, but also locking pressure from the latch-devices 16, whereupon said devices can be readily tripped to the open or inactive position as shown at the left-hand side of Fig. VII, in opposition to the springs 17, by dot-and-dash finger indication, whereupon each device 16 can be held in such open position by inserting a nail or pin 62 through the lug hole 30 in an obvious manner, when the valve 20 and associated parts can be lifted out as hereinbefore set forth, and replaced by a reversal of the movements above described.

From the foregoing it will be appreciated that the invention disclosed fully justifies the objects and advantages set forth. It is also to be understood it is not desired to limit the disclosure to the exact details of construction shown and explained, for various modifications within the scope of the following claims may occur to those conversant with the art, hence it is intended to include all such changes or other applications of the inventive features herein as the state of the prior art permits.

Having thus described my invention, I claim:

1. In combination a tank; an emergency valve with an apertured housing projected into the tank; a downwardly-influenced valve seatable in the housing and having a normal lift above its seat; a bonnet with pivotal latching means coactive with an annular groove in the valve housing; and said valve, when raised above its normal lift, coacting with the latching means to release the bonnet for joint removal with the valve from the housing.

2. In combination a tank; an emergency valve including a circumferentially-apertured housing extending into the tank with an inner groove proximate its top; a downwardly-influenced disc valve in the housing having a normal predetermined lift; a flanged bonnet for the housing with a cylindrical projection; a spring-influenced stem reciprocative in said projection and having the disc valve attached thereto; latching devices pivotally supported by the bonnet and coactive with the groove to lock said bonnet to the housing; and means whereby the valve is raisable above its normal lift to effect tripping of the latching devices for joint release and removal of the bonnet and valve, and vice versa.

3. In combination a tank; an emergency valve including a circumferentially-apertured housing extending into the tank with an inner groove proximate its top; a downwardly-influenced disc valve in the housing having a normal predetermined lift; a flanged bonnet for the housing with a cylindrical projection; a spring-influenced stem reciprocative in said projection and having the disc valve attached thereto with a bail at its upper extremity; latching devices pivotally supported by the bonnet and coactive with the groove to lock said bonnet to the housing; and the disc valve stem bail serving for raising the valve above its normal lift to effect tripping of the latching devices for joint release and removal of the bonnet and valve, and vice versa.

4. The combination of claim 2, wherein the latching devices are spring-influenced outwards, and embody heel portions for coaction with the valve upper face to effect their movement inwards for release from the valve housing.

5. The combination of claim 2, wherein each latching device embodies a lower heel portion for coaction with the valve upper face to effect its movement inwards, and a lateral upper projection for coaction with means on the bonnet flange to limit outward movement of the device latching portion.

6. The combination of claim 2, wherein each latching device embodies a projection for engagement below the upper edge of the housing inner groove, a hub portion for its pivotal support between lugs on the bonnet flange, a heel portion at the back of the projection aforesaid, an apertured lug for reception of a suitable pin to hold the device in inactive position, and a finger piece whereby the device is manually operable for unlocking purposes.

JAMES A. JENSEN.